(12) United States Patent
Gault et al.

(10) Patent No.: US 9,839,845 B2
(45) Date of Patent: *Dec. 12, 2017

(54) GAME EXECUTION ENVIRONMENTS

(71) Applicant: Sony Interactive Entertainment America LLC, San Mateo, CA (US)

(72) Inventors: Andrew Buchanan Gault, San Francisco, CA (US); Rui Filipe Pereira, Aliso Viejo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,885

(22) Filed: Aug. 22, 2016

(65) Prior Publication Data
US 2016/0354690 A1 Dec. 8, 2016

Related U.S. Application Data

(60) Continuation of application No. 14/579,877, filed on Dec. 22, 2014, now Pat. No. 9,426,198, which is a
(Continued)

(51) Int. Cl.
*A63F 13/00* (2014.01)
*A63F 13/355* (2014.01)
(Continued)

(52) U.S. Cl.
CPC ............ *A63F 13/355* (2014.09); *A63F 13/00* (2013.01); *A63F 13/10* (2013.01); *A63F 13/12* (2013.01); *A63F 13/335* (2014.09); *A63F 13/35* (2014.09); *A63F 13/42* (2014.09); *A63F 13/537* (2014.09); *A63F 13/71* (2014.09); *A63F 13/77* (2014.09); *A63F 13/795* (2014.09); *A63F 13/86* (2014.09); *A63F 13/87* (2014.09); *G06F 9/45537* (2013.01); *G06F 9/45558* (2013.01); *H04L 29/06027* (2013.01); *H04L 65/4069* (2013.01); *H04L 65/607* (2013.01); *H04L 65/80* (2013.01); *H04L 67/18* (2013.01); *H04L 67/38* (2013.01); *H04N 19/44* (2014.11); *A63F 2300/407* (2013.01); *A63F 2300/409* (2013.01); *A63F 2300/51* (2013.01); *A63F 2300/538* (2013.01); *A63F 2300/552* (2013.01);
(Continued)

(58) Field of Classification Search
CPC .. A63F 13/00; A63F 2300/51; A63F 2300/53; A63F 2300/538; A63F 2300/552
USPC ..................................... 463/40, 42
See application file for complete search history.

(56) References Cited

U.S. PATENT DOCUMENTS

2006/0200821 A1 9/2006 Cherkasova et al. .......... 718/1

OTHER PUBLICATIONS

App. No. GB1122377.3, Further Search Report Under Section 17, dated Jun. 16, 2017.

*Primary Examiner* — Michael Cuff
(74) *Attorney, Agent, or Firm* — Martine Penilla Group, LLP

(57) ABSTRACT

Systems and methods for executing multiple video games, or other sources of video, include a cloud game execution environment in which each game application is executed on the same operating system but within a virtual I/O shell. The virtual I/O shell includes virtual video, audio and input channels that allow each game application to operate as if it had dedicated drivers. In some embodiments, the systems and methods of the invention are used to provide video streams to a plurality of clients over the internet.

20 Claims, 4 Drawing Sheets

Related U.S. Application Data continuation of application No. 13/933,991, filed on Jul. 2, 2013, now Pat. No. 8,944,915, which is a division of application No. 12/790,955, filed on May 31, 2010, now Pat. No. 8,506,402.

(60) Provisional application No. 61/183,035, filed on Jun. 1, 2009, provisional application No. 61/183,037, filed on Jun. 1, 2009, provisional application No. 61/183,088, filed on Jun. 2, 2009, provisional application No. 61/183,546, filed on Jun. 2, 2009, provisional application No. 61/323,354, filed on Apr. 12, 2010, provisional application No. 61/345,534, filed on May 17, 2010.

(51) Int. Cl.

| | |
|---|---|
| *H04L 29/06* | (2006.01) |
| *A63F 13/77* | (2014.01) |
| *A63F 13/42* | (2014.01) |
| *A63F 13/40* | (2014.01) |
| *A63F 13/30* | (2014.01) |
| *G06F 9/455* | (2006.01) |
| *A63F 13/35* | (2014.01) |
| *A63F 13/537* | (2014.01) |
| *A63F 13/795* | (2014.01) |
| *H04N 19/44* | (2014.01) |
| *H04L 29/08* | (2006.01) |
| *A63F 13/335* | (2014.01) |
| *A63F 13/86* | (2014.01) |
| *A63F 13/87* | (2014.01) |
| *A63F 13/71* | (2014.01) |

(52) U.S. Cl.
CPC ............. *G06F 2009/45579* (2013.01); *G06F 2009/45595* (2013.01); *H04L 67/10* (2013.01)

US 9,839,845 B2

GAME EXECUTION ENVIRONMENTS

CLAIM OF PRIORITY

This application is a continuation of U.S. patent application Ser. No. 14/579,877, filed on Dec. 22, 2014, now issued as U.S. Pat. No. 9,426,198, issued on Aug. 23, 2016, and entitled "Game Execution Environments", which is a continuation of U.S. patent application Ser. No. 13/933,991, filed on Jul. 2, 2013, now issued as U.S. Pat. No. 8,944,915, issued on Feb. 3, 2015, and entitled "Game Execution Environments", which is a divisional of U.S. patent application Ser. No. 12/790,955, filed May 31, 2010, now issued as U.S. Pat. No. 8,506,402, issued on Aug. 13, 2013, and entitled "Game Execution Environments" which further claims priority and benefit of the following provisional patent applications:

61/183,035 filed Jun. 1, 2009 and entitled "Game Server Architecture,"

61/183,037 filed Jun. 1, 2009 and entitled "Bufferless H.264 Variant,"

61/183,088 filed Jun. 2, 2009 and entitled "I/O Level Virtualization,"

61/183,546 filed Jun. 2, 2009 and entitled "Self-Spawning Game Environments,"

61/323,354 filed Apr. 12, 2010 and entitled "Artificial Frames," and

61/345,534 filed May 17, 2010 and entitled "Dynamic Game Server Including Qualifier."

This application is related to U.S. patent application Ser. No. 12/790,948 filed May 31, 2010 and entitled "Bufferless H.264 Variant."

All of the above patent applications are hereby incorporated herein by reference.

FIELD OF THE INVENTION

The invention is in the fields of video generation and distribution.

RELATED ART

Virtual environments are used to support multiple independent applications on a single hardware device. VMware, Inc. of Palo Alto Calif. supports one type of virtual environment system. Software available from VMware, Inc. includes VMware ESX, VMware Server, VMware Workstation and VMware. These software allow multiple virtual machines to run on a single hardware device.

In the architecture used by VMware, Inc. an operating system (e.g., ESX) is installed on the hardware. This operating system is specifically configured to support multiple virtual environments. Programs running in these virtual environments are isolated from each other by the virtual environments and do not interact directly with the base operating system (e.g., ESX) on which the virtual environments are running. Each virtual environment is typically allocated a specific set of fixed resources (e.g., memory). Within each environment is installed a separate operating system. Different operating systems may be placed within each virtual environment. Finally, within each virtual environment are installed desired executable applications (e.g., accounting programs or database programs) and drivers. The architecture used by VMware and other virtual environment system vendors requires that each virtual environment have its own operating system.

SUMMARY

Various embodiments of the invention include a virtualization architecture in which executable applications can share a common operating system but operate in virtual environments at the I/O (input/output) level. For example, executable applications can share operating system resources such as memory, drivers and processor time, while having separate (virtualized) control channels, input channels, sound channels, and video channels. This type of virtualization is referred to herein as I/O level virtualization.

In some embodiments of the invention I/O level virtualization is used to execute a plurality of video game environments. Each game environment may include a different video game played by different geographically distributed players. The video games run on the same operating system but within a virtual I/O shell that captures inputs and outputs. The virtual I/O shell includes, for example, virtual sound, video and input drivers. In some embodiments the virtual sound, video and input drivers are configured to provide separate I/O channels to different clients. The virtual I/O shell can be automatically applied each time execution of a video game is executed.

Various embodiments of the invention include a method of executing a plurality of video games, the method comprising receiving a request for execution of a first video game; provisioning the first video game on a hardware device; establishing a first virtual I/O shell around the first video game, the first virtual I/O shell being configured to redirect video data or audio data received from the first video game; executing the first video game on an operating system; receiving a request for execution of a second video game; provisioning the second video game on the hardware device; establishing a second virtual I/O shell around the second video game the second virtual I/O shell being configured to redirect video data or audio data received from the second video game; and executing the second video game on the same instance of the operating system, the operating system being configured for execution of computing instructions on a hardware device, the first video game and the second video game being executed in parallel.

Various embodiments of the invention include a game delivery system comprising geographically distributed data centers configured to provide streaming game video to a plurality of game playing devices; a local or regional manager configured to test the ability of members of the data centers to provide the streaming game video to a specific member of the plurality of game playing devices; regional computing centers configured to allocate requests for game video to members of the data centers, the allocation being based on an ability of the members to provide the game video to the specific member of the plurality of game playing devices at a minimum level of quality and lag; and global computing elements configured to manage the regional computing centers and data centers, the global computing elements optionally being configured to track the amount of streaming game video (in time or number of bytes) provided by the data centers.

Various embodiments of the invention include a method of providing a video game, the method comprising establishing a game room in response to a request from a first game player; receiving a request for a video game from the first game player; selecting a first execution environment for delivery of the video game to the first player based on an ability to provide the game with a minimum lag time and/or quality of service; providing the video game as streaming video from the first execution environment; adding a second game player to the game room; determining that a second execution environment is more qualified to provided the computer game to both the first game player and the second game player, relative to the first execution environment; optionally executing copies of the video game at both the first execution environment and the second execution environment in parallel; optionally synchronizing the execution of the copies of the video game so that the source of the streaming video can be changed from the first execution environment to the second execution environment without significantly interrupting the video game; and providing the video game as streaming video from the second execution environment.

Various embodiments of the invention include an application execution environment comprising a local manager configured to establish a virtual I/O shell around an executable application, the virtual I/O shell configured to appear as a local hardware or software device to the executable application; a virtual sound channel driver configured to redirect sound received from the executable application to the local manager and optionally to provide sound from the local manager to the executable application, the virtual sound channel driver having an API to the executable application that is included in the virtual I/O shell and is configured to simulate one or more local hardware or software sound devices; a virtual video channel driver configured to redirect video data received from the executable application and optionally to provide video data from the local manager to the executable application, the virtual video channel driver having an API to the executable application that is included in the virtual I/O shell and is configured to simulate one or more local hardware or software video devices; memory configured to store the local manager, the virtual input channel driver, the virtual sound channel driver or the virtual video channel driver; and a microprocessor configured to execute the local manager, the virtual input channel driver, the virtual sound channel driver or the virtual video channel driver.

Various embodiments of the invention include a game delivery system comprising plurality of virtual I/O shells each configured to receive and redirect sound and video from a separate video game application; local manager configured to execute the separate video game applications on a shared operating system, each of the separate video game applications being in one of the virtual I/O shells and accessing the shared operating system for non-I/O operations; and a streaming server configured to stream video and audio from the separate video game applications, video and audio from each of the video game applications being streamed to a different client.

Various embodiments of the invention include a game delivery architecture comprising local components configured to provide those game services for which minimal lag is important, the game services including delivery of game video and audio; regional components configured to manage non-streaming functionality of a video game and to assign a request for the video game to a member of the local components; and global components configured to manage the regional and local components.

DETAILED DESCRIPTION

Figure 1:
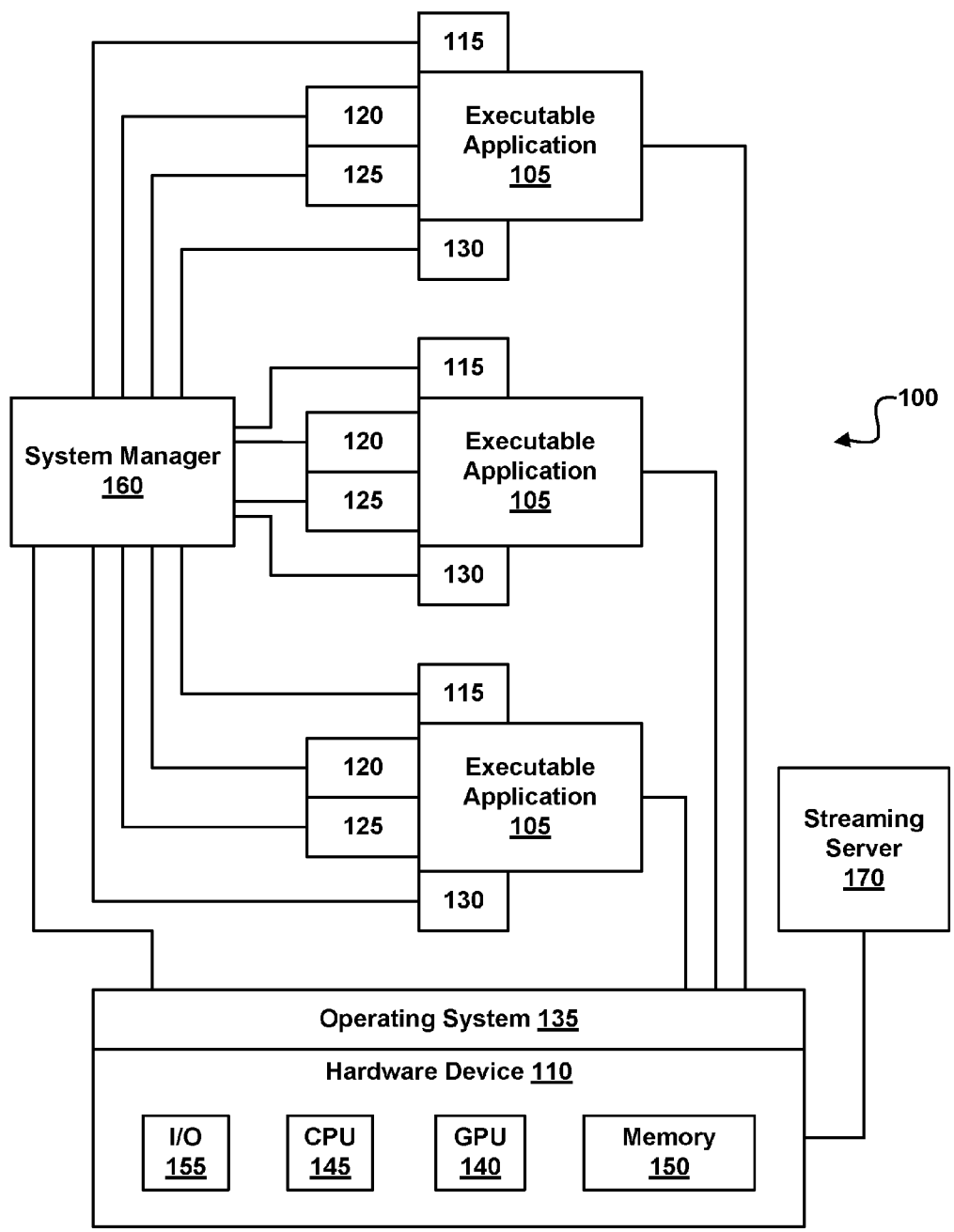
FIG. 1 illustrates an application execution environment, according to various embodiments of the invention.

FIG. 1 illustrates an Application Execution Environment 100, e.g., a game system, according to various embodiments of the invention. Application Execution Environment 100 is configured to execute a plurality of Executable Applications 105 on a single Hardware Device 110. Each of the Executable Applications 105 is executed in association with its own virtual I/O shell. The virtual I/O shell typically includes a virtual Input Channel Driver 115, a virtual Sound Channel Driver 120, a virtual Video Channel Driver 130 and/or a virtual Control Channel Driver 125. Each Executable Application 105 also is associated with a Local Manager 160. In various embodiments the Executable Applications 105 include a plurality of different video games and/or separate instances of the same video game.

The I/O shell is configured to provide virtualization at the I/O (input/output) level. Thus, only one instance of an Operating System 135 is required to support two, three or more Executable Applications 105. The virtualization occurs above the operating system level. The virtual I/O shell does not prevent the Executable Applications 105 from each accessing a Central Processing Unit 145, and/or system Memory 150. However, the virtual I/O shell typically does prevent the Executable Applications 105 from directly accessing some physical I/O devices, such as ports, within Hardware Device 110. For example, the virtual I/O shell is configured to allow each of the Executable Applications 105 to share the Graphics Processing Unit 140 via Video Channel Driver 130. The Graphics Processing Unit 140 is a 3D rendering engine that can be shared by a plurality of the Executable Applications 105. In typically embodiments, Graphics Processing Unit 140 includes a dedicated graphics microprocessor. The virtual I/O shell optionally includes a Windows emulator.

Local Manager 160 is configured to establish a virtual I/O shell around each Executable Application 105. The virtual I/O shell is configured to appear as local hardware and/or software devices to each of the Executable Applications 105. The virtual I/O shell is optionally configured to provide a separate input, audio and video channels (and optionally a control channel) for each of the Executable Applications 105. These channels are managed by Local Manager 160, which redirect, optionally bidirectional, signals through these channels. Local Manager 160 is configured to redirect these signals to a Streaming Server 170 and/or to locations outside Application Execution Environment 100. Operating System 135 is configured to support execution of the Executable Applications 105, Local Manager 160 and the virtual I/O shell. Operating System 135 may be, for example, Windows, Linux, UNIX or Apple OS based. Operating System 135 is optionally configured to execute computing instructions compiled for a game console such as PlayStation, or Xbox or Nintendo.

One Local Manager 160 is optionally associated with more than one Application Execution Environment 100 in the same location. In various embodiments, Local Manager 160 is further configured for game ranking, optimizing the use of game servers for particular players, moving game play between Executable Applications 105, cashing of games, storing game states, controlling access (e.g., password access) to games, balancing game server load, and/or the like. Local Manager 160 is optionally configured to access a library of Executable Applications 105 and to provision an Executable Application 105 from this library to Application Execution Environment 100. The library of Executable Applications 105 is optionally disposed at a distant data center. Parts of Local Manager 160 may be distributed among several computing devices. These computing devices may be geographically distributed and may communicate with each other over the internet. In some embodiments an instance of Local Manager 160 is configured to manage several instance of Application Execution Environment 100.

Input Channel Driver 115 is configured to provide input to the Executable Applications 105 through a virtually separate input channel. The virtual Input Channel Driver 115 has a separate API (Application Program Interface) to each of the Executable Applications 105. This API is included in the virtual I/O shell and is typically configured to simulate one or more local hardware or software input devices. For example, Input Channel Driver 115 may simulate a Linux or Windows I/O driver and port. The Input Channel Driver 115 also has an API configured to receive the input from the Local Manager 160. The Local Manager 160 typically receives this input from an external client, e.g., a game player's computing device, over a communication network. The APIs of Input Channel Driver 115 are configured such that each of Executable Applications 105 can operate as if they have their own dedicated input channel.

The virtual Sound Channel Driver 120 is configured to redirect sound data received from the Executable Applications 105 to the Local Manager 160 and optionally to provide sound from the Local Manager 160 to the Executable Applications 105, the virtual Sound Channel Driver 120 has an API to each Executable Application 105 that is included in the virtual I/O shell and is typically configured to simulate one or more local hardware or software sound devices. For example, the API may simulate a Linux or Windows® sound driver and audio hardware. The several Sound Channel Driver 120 illustrated in FIG. 1 are optionally a part of a sound server configured to receive sound from a plurality of Executable Applications 105 and to redirect the received sound to a plurality of output channels, e.g., a plurality of remote clients. This redirection is optionally first to a Windows® API such as "Wine" or memory that can be accessed by Local Manager 160. In various embodiments, Sound Channel Driver 120 and the sound server are configured to redirect sound with less than 5, 10, 15, 20, 30 or 50 milliseconds delay. In various embodiments, Sound Channel Driver 120 and the sound server are configured to redirect sound while buffering the redirected sound less than 1, 2, 3, 4, 6 or 8 times.

The virtual Video Channel Driver 130 is configured to redirect video data received from the Executable Applications 105 and optionally to provide video data from the Local Manager 160 to the Executable Applications 105. The video data received from the Executable Applications 105 may be game video generated by the Executable Applications 105 or game video generated elsewhere and processed by the Executable Applications 105. Instances where video may be provided to the Executable Applications 105 include embodiments wherein the Executable Applications 105 make use of overlays or real-time video generated externally. The Video Channel Driver 130 each includes an API to one of Executable Applications 105. The API is included in the virtual I/O shell and is typically configured to simulate one or more local hardware or software video device. As such, each of Executable Applications 105 can operate as if they have their own dedicated video driver and/or exclusive use of graphics hardware. Video Channel Driver 130 optionally includes the Virtual GL video emulator available for the Linux operating system. Virtual GL allows redirection of video calls that would normally go to a video card, and redirects these calls to software accessible memory, e.g., memory accessible to Local Manager 160 or to a non-virtual video driver having control of Graphics Processing Unit 140. In some embodiments, each Video Channel Driver 130 receives video data (e.g., a game environment) from an assigned Executable Application 105 and passes this video data to a driver controlling Graphics Processing Unit 140. Graphics Processing Unit 140 is, thus, shared by more than one Executable Application 105 while each Executable Application 105 can execute as if it has exclusive use of a video driver and Graphics Processing Unit 140. As used herein the term "game environment" refers to a three dimensional virtual environment including in game objects, object properties, avatars, locations of objects, their shapes, textures, and spatial relationships there between, and/or the like.

The several Video Channel Driver 130 is optionally part of a video server configured to receive video from multiple sources and redirect the received video to multiple destinations. This redirection can include a variety of combinations. For example, some video may be received from one source and sent to one destination, some video may be received from more than one source (combined or overlaid) and sent to one destination, some video may be received from one source and sent to multiple destinations, etc.

The Application Execution Environment 100 illustrated in FIG. 1 optionally further comprises a control channel configured for communicating application control commands to the executable application through the Local Manager 160. These control command may include, for example, a pause button control, a change game control, a graphics command in response to a cursor over, game crash recovery, and/or the like.

Application Execution Environment 100 further comprises Memory 150 configured to store the Local Manager 160, the virtual Input Channel Driver 115, the virtual Sound Channel Driver 120 and/or the virtual Video Channel Driver 130. Memory 150 may also be shared by the various Executable Applications 105 during execution. Memory 150 comprises random access memory (RAM), optical memory, flash memory, magnetic memory, and/or other memory configured to store computing instructions and/or data.

Application Execution Environment 100 further comprises Central Processing Unit 145 configured to execute the Local Manager 160, the virtual input channel driver, the virtual sound channel driver and/or the virtual video channel driver. Central Processing Unit 145 is an electronic or optical processor configured to execute computing instructions. Application Execution Environment 100 may be divided among several hardware devices.

In some embodiments Application Execution Environment 100 is configured to execute the Executable Applications 105 in a Microsoft Windows emulator and/or the operating system is a non-windows operating system. For example, Executable Applications 105 may be executed within the "Wine" windows API for Linux.

In various embodiments of the invention the Application Execution Environment 100 illustrated in FIG. 1 is a game delivery system. The game delivery system includes plurality of virtual I/O shells. Each of the virtual I/O shells is configured to receive and redirect at least sound and video from a separate video game application, e.g., form a separate Executable Application 105. In these embodiments Local Manager 160 is configured to execute the separate video game applications on a shared operating system, each of the separate video game applications being in one of the virtual I/O shells and accessing the shared operating system for non-I/O operations.

These embodiments also typically include Streaming Server 170. Streaming Server 170 is configured to stream video and audio from the separate video game applications. The video and audio from each of the video game applications is typically streamed to a different client or clients. In some embodiments, Streaming Server 170 includes a video encoding system such as that taught in U.S. provisional patent application No. 61/183,037. The Streaming Server 170 is optionally configured to encode to a High Profile (or better) H.264 codec lacking B-frames. The separate video game applications may be configured to serve different instance of the same video game and/or configured to serve different video games.

Streaming Server 170 is optionally configured to switch between video codecs mid-stream while streaming video received from Executable Applications 105. The decision to change video codec may be based on the size of the video, the quality (e.g., color depth) of the video and/or the frame rate (or frame drop rate), and the lag time required to generate and encode the video. In some embodiments, these parameters are used to calculate a quality factor. The calculation of the quality factor can be dependent on the specific game. For example, video quality may be given a greater weight in a game such at World of Warcraft or Eve that is very dependent on dramatic colors, relative to a game such as MarioKart wherein a minimal lag time may be more important. A change between video codecs can occur when the quality factor falls below a required level. The change may, therefore, be responsive to a lag between the streaming server and one of the different player's clients. In some embodiments, the Streaming Server 170 is configured to switch to a lower quality codec in order to reduce lag between the streaming server and one of the different clients, when the lag or the quality factor reaches a threshold value. Streaming Server 170 is optionally configured to deliver video of different codecs to different destinations, e.g., different IP addresses. Streaming Server 170 may share hardware, such as Central Processing Unit 145 and/or Graphics Processor Unit 140, with Hardware Device 110.

In some embodiments, Local Manager 160 is configured to simulate a virtual console. This simulation allows (game) players at different locations to play a game as if they were at the same location playing on a game console. For example, some video games are designed to receive multiple players' inputs at a single console. Local Manager 160 may be configured to combine inputs from different clients, e.g., from different IP addresses. More than one player client can, thus, provide input and receive video from a single Executable Application 105. In combining these inputs, keystrokes made at the different clients are mapped to inputs of a virtual game console. The virtual game console is emulated by Executable Application 105. From the point of view of the video game application the inputs are being received at a game console, e.g., from a single keyboard or from a set of game controllers. Executable Application 105 is optionally configured to map inputs from different clients to a single virtual keyboard. For example, two game players using different clients may wish to use a space bar to enter a "jump" command. In this case Executable Application 105 is configured to may these inputs to different keys of a virtual keyboard.

In some embodiments, the video game applications are themselves clients of server based video games. For example, the video game applications can be clients of massive online multiplayer games such as Eve or World of Warcraft. These games are, in part, executed remotely by a third party. Executable Applications 105 can communicate with these third parties just as any other client would.

In some embodiments Streaming Server 170 is configured to deliver video from Executable Applications 105 to multiple destinations that include, for example, two or more different web pages. One of these two web pages can by the web page through which a player interacts with Application Execution Environment 100 and plays a game. A second of these web pages can be a blog, social networking site, a guild website, advertisement, or the like. The presentation of the video at the second web page optionally includes a link configured to allow a user to play the game, join another player in the game, or interact with another player in the game. For example, a player may have a blog to which a copy of his game is delivered, from his point of view. Third parties can observer the player's viewpoint of the game on the player's blog. If the third party wishes to join the player in the game the third party can click the link. In response to this click the third party may be given a trial introduction to the game, be added to a game room with the player, communication with the player in the game, and/or the like. In some embodiments, one of the multiple destinations to which video are delivered includes a storage location configured for storing the game video. The storage location can be a website, a blog, a file server, a web server, a social networking site, and/or the like. Copies of video provided by Streaming Server 170 optionally have different qualities and may be sent to multiple destinations. Streaming Server 170 is optionally configured to access and stream previously stored game video.

Streaming Server 170 is optionally configured to combine video with other video or still images. For example Streaming Server 170 may be configured to add a logo to video before streaming, or add the output of a webcam to video before streaming. In some embodiments, Streaming Server 170 is configured to overlay a game interface over video generated using Graphics Processing Unit 140. For example, if the client to which the game video is to be delivered has a touch screen interface and the computer game was designed to be played using a keyboard or game controller, then an overlay may be configured to provide user game control inputs appropriate for a touch screen interface.

In some embodiments, Local Manager 160 is configured to automatically spawn an additional video game application within a virtual I/O shell responsive to a request to play the video game application. Such requests can come from several sources including, for example, from Streaming Server 170, from a player in a game room, from a solo player, or from a link included in a third party website, and/or the like. A game room is a virtual space in which players can gather and request and play games as a group. For example, a game normally played on a four player game console may be requested by four players gathered in a game room. Presence in the room determines which players are playing at the virtual console. Players in a game room may join and leave games as a group. A game room is optionally associated with the account of a particular player who has the privileges required to invite or remove other players.

Requests for an new spawn that come from Streaming Server 170 or Local Manager 160 may be the result of a determination that a game being played on first instance of Application Execution Environment 100 would be better played on a second instance of Application Execution Environment 100. For example, lag may be reduced by playing the game at an instance of Application Execution Environment 100 with a faster connection to a player's client. The faster connection may be due to being closer geographically or by having communication channels with greater available capacity. In these cases the new spawn may be a (seamless) continuation of a currently running game. A player may be in the middle of playing a game and Local Manager 160 may determine that a second Application Execution Environment 100 at a different location would be able to provide a better quality of service. A new Executable Application 105 is spawned at the second Application Execution Environment 100, the current Executable Application 105 is synchronized with the new Executable Application 105 and the game play is transferred essentially seamlessly. In various embodiments this transfer can be accomplished without interrupting game play. Synchronization optionally includes sending player input to both Executable Applications 105 until they reach the same game state. The transfer can then be accomplished by choosing to received video and audio from the new Application Execution Environment 100 rather than the original Application Execution Environment 100.

A request that a new Executable Application 105 be spawned may come from a player in a game room when one or more players in a game room choose to start playing a new game or switch to a new game. For example, a group of players in a game room may select a game to play together and make a request for that game. This will typically result in the spawning of a new Executable Application 105 including game executable. The I/O shell around the new spawn will be configured to communicate audio and video to the clients of the players who are in the game room.

In some embodiments, a change in the identity of players within a game room will result in a new Executable Application 105 being spawned. For example, if the game room is occupied by three players, the selection of the best Application Execution Environment 100 may be in part of the geographic location of the three players. The three players may be geographically distributed. The geographic distribution includes both their physical locations and their distance adjusted for the available bandwidth between locations. If one of the three players leaves the room and/or another player enters the room, this may result in a different geographic distribution. If Regional Manager 343 determines that this different geographic distribution would be better served by an Application Execution Environment 100 at a different location, a new Executable Application 105 will be spawned at the different location and the game play will be transferred to the new Executable Application 105 as described elsewhere herein.

A solo player may request a video game to play or to change between video games. This request will typically result in the spawning of an Executable Application 105. The Executable Application 105 is spawned at the best Application Execution Environment 100 for providing the game to the solo player. The selection of the best Application Execution Environment 100 may be dependent on the player's connection history and experience with connecting to different Application Execution Environment 100. The quality of the player's experience is dependent on, for example, the size of the desired image, the quality of the desired image, a frame drop rate, and the lag between the player's client and the Application Execution Environment 100. If a player's connection to an Application Execution Environment 100 changes during game play, the player may be automatically switched to a different Application Execution Environment 100 during the game.

A request for the spawning of a new Executable Application 105 may come from a link included in a third party website. The link is optionally encoded to identify the website and is typically associated with text, an image, or video. For example, a player may select to have a copy of their video streamed to a blog or a social networking website. Another person can click on this video to communication with the player, to going the player in the game, to try a free trial of the game, and/or to play the game independently of the player. Players in a game guild may select to have their video sent to a guild associated website. The video at the third party website can be approximately real-time or saved and displayed after a delay. Clicking the link typically results in the automatic spawning of a new Executable Application 105.

Streaming Server 170 is optionally configured to communicate video using RTMP.

Figure 2:
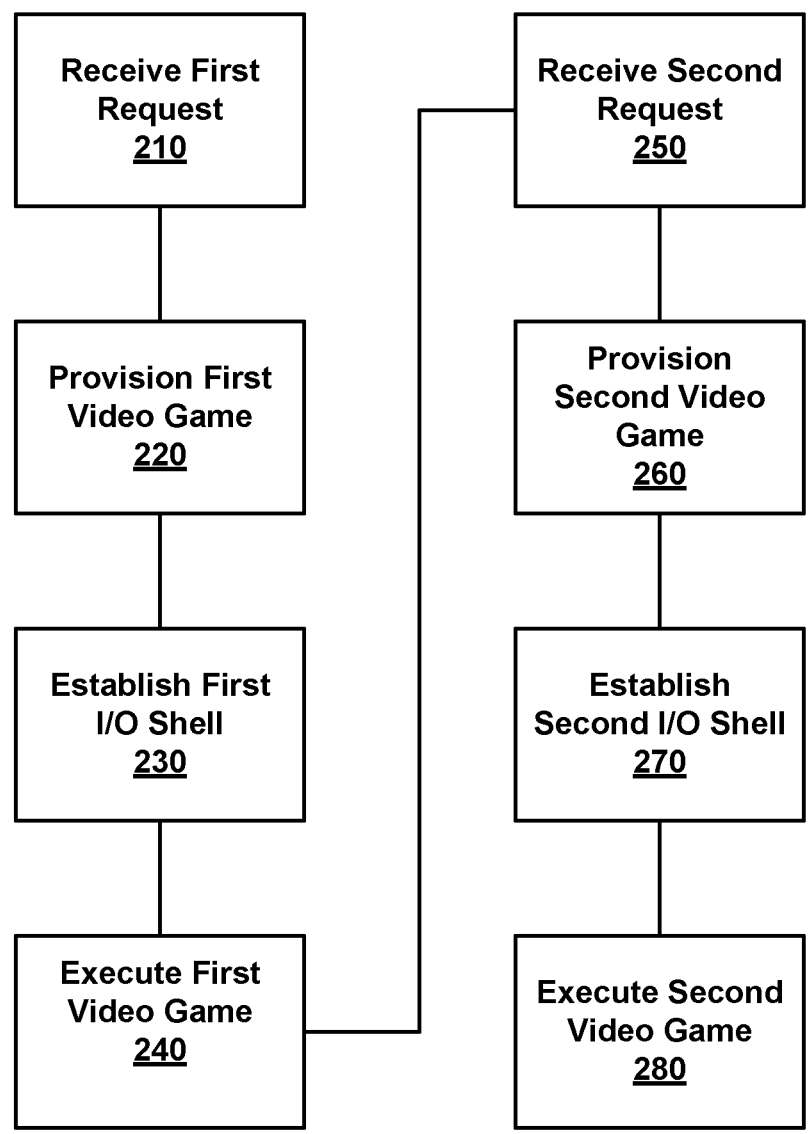
FIG. 2 illustrates a method of executing a plurality of executable applications within virtualized I/O shells, according to various embodiments of the invention.

FIG. 2 illustrates a method of executing a plurality of executable applications (e.g., video games) within virtualized I/O shells, according to various embodiments of the invention. These video games can be stand alone game of clients of video games supported by a remote server. In this method the video games are executed in a non-virtualized environment with respect to an operating system but in a virtual environment with respect to one or more I/O functions.

In a Receive First Request Step 210 a request for a first video game is received. This request can be received from a game player or a game playing device. The request can be the result of the game player clicking on a link. The request is receive by Local Manager 160, which may select a specific Application Execution Environment 100 in which the game is to be executed. This selection may be based on, for example, the availability of resources within the Application Execution Environment 100 and/or on the quality of communication channels between the Application Execution Environment 100 and a client of the game player.

In a Provision First Video Game Step 220 the requested video game is provisioned on Hardware Device 110. This provisioning may include transferring required files (e.g., computing instructions and data) from a remote location. The provisioned video game is loaded into Memory 150. The provisioning is typically managed by Local Manager 160.

In an Establish First I/O Shell Step 230 a first I/O shell is established around the video game provisioned in Provision First Video Game Step 220. The first I/O shell is configured to redirect inputs, commands, video data or audio data received from or sent to the first video game. The first I/O shell may include any combination of virtual Input Channel Driver 115, virtual Sound Channel Driver 120, virtual Video Channel Driver 130 and virtual Control Channel Driver 125. Establishing the first I/O shell includes linking the APIs of virtual Input Channel Driver 115, virtual Sound Channel Driver 120, virtual Video Channel Driver 130 and/or virtual Control Channel Driver 125 to the outputs and inputs of the video game provisioned in Provision First Video Game Step 220. For example, because of this linking video data generated by Executable Application 105 will be sent to Video Channel Driver 130 rather than to a driver more directly associated with Graphics Processing Unit 140.

In an Execute First Video Game Step 240 the video game provisioned in Provision First Video Game Step 220 is executed. This execution normally occurs on Operating System 135. As part of the execution game commands may be received from a game playing device, a game state is updated and/or received from an external device, and a game environment is generated for rendering by Graphic Processing Unit 140. Some or all of these processes occur through the first I/O shell. For example, a game environment generated by Executable Application 105 may be passed to Video Channel Driver 130 and then to Graphics Processing Unit 140 for rendering to a video stream.

In a Receive Second Request Step 250 a request for execution of a second video game is received. The second video game may be a different instance of the first video game or a different video game. As in Receive First Request Step 210, this request can be received from a game player or a game playing device, etc. The request in Receive Second Request Step 250 is often from a different player than the request in Receive First Request Step 210.

In a Provision Second Video Game Step 260 the second video game is provisioned on Hardware Device 110. Both the first video game and the second video game are provisioned on the same computing device.

In an Establish Second I/O Shell Step 270 a second I/O shell is established around the second video game. The second I/O shell is configured to redirect commands, inputs, video data or audio data to or from the second video game. The second I/O shell can include any combination of virtual Input Channel Driver 115, virtual Sound Channel Driver 120, virtual Video Channel Driver 130 and virtual Control Channel Driver 125. The second I/O shell provides communication (I/O) channels that are isolated from communication channels through the first I/O shell. The first or second I/O shell optionally includes a Windows emulator.

In an Execute Second Video Game Step 280 the second video game is executed. This execution is supported by the same Operating System 135 on which the first video game is executed. Operating System 135 is configured for execution of computing instructions on a hardware device. Unlike the I/O functions of the first and second I/O shells, the operating system is typically not virtualized or executed in a virtual environment. The first video game and the second video game are optionally executed in parallel.

Figure 3:
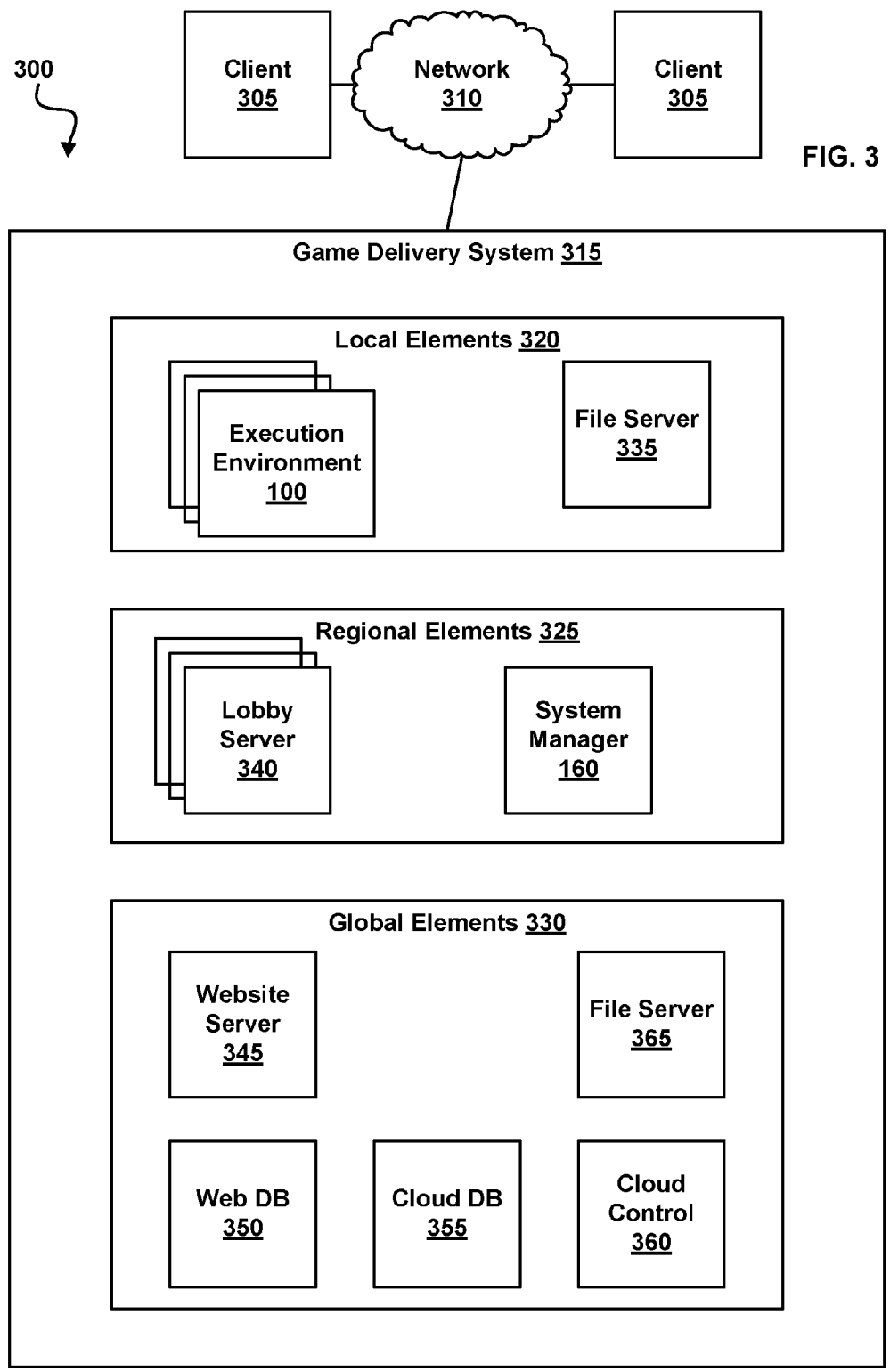
FIG. 3 illustrates a game delivery architecture, according to various embodiments of the invention.

FIG. 3 illustrates a Game Delivery Architecture 300, according to various embodiments of the invention. Game Delivery Architecture 300 comprises a one or more Clients 305, a Network 310, and a Game Delivery System 315. Clients 305 are typically game playing devices, such as personal computers, game consoles, tablet computers, telephones, handheld game players, and/or the like. Clients 305 are used by game players to play a video game.

Network 310 includes a communication network such as the internet, a telephone network, a wide area network, a local area network, and/or the like. Network 310 is configured to allow communication between Clients 305 and Game Delivery System 315, between elements within Game Delivery System 315, and optionally between Clients 305.

Game Delivery System 315 is a geographically distributed system of computing devices configured to provide computer game video to Clients 305 via Network 310. Game Delivery System 315 is a hierarchical system comprising many Local Elements 320, some Regional Elements 325, and one Global Element 330.

Local Elements 320 include computing devices configured to generate and send game video to Clients 305. Local Elements 320 each include one or more instance of Application Execution Environment 100 and Streaming Server 170. Local Elements 320 are geographically disposed to server game video to Clients 305 over a relatively short distance and with a minimum lag. For example, Local Elements 320 can include a data center configured to serve a specific city, or metropolitan region. Typically, the locations of Local Elements 320 are selected so as to most efficiently serve as many game players as possible. In some embodiments, each Local Element 320 includes two or more Hardware Device 110 each configured to support the execution of 2, 3, 4, 5, 6 or more Executable Applications 105 (computer games) within virtual I/O shells.

Local Elements 320 each optionally further include a File Server 335. File Server 335 is configured for providing computing instructions and data to the one or more Application Execution Environment 100 within each of the Local Elements 320. For example, File Server 335 may be used as a source of game instructions in Provision First Video Game Step 220 and Provision Second Video Game Step 260. Likewise, File Server 335 may be used as a source of virtual components in Establish First I/O Shell Step 230 and Establish Second I/O Shell Step 270.

Regional Elements 325 are configured to manage several instance of Local Elements 320 distributed over a larger region than any one of the Local Elements 320 is configured to server. For Example, an instance of Local Elements 320 may be configured to support a large geographical region such as the Western United States or Western Europe. An instance of Local Elements 320 is optionally configured to support Local Elements 320 over an entire continent.

Regional Elements 325 include one or more Lobby Servers 340 and optionally a Regional Manager 343. Regional Manager 343 is may be included in one of Local Elements 320 or Global Elements 330. Regional Manager 343 is an embodiment of Local Manager 160 configured to perform tasks that are not time critical and/or that involve multiple Application Execution Environments 100. Lobby Servers 340 are configured to manage non-streaming or non-time sensitive functionality related to game delivery. These can include instant messaging style chat, connection status information, player login, coordination between Application Execution Environments 100, and/or the like. Lobby Servers 340 are also configured to manage virtual game rooms configured for a group of game players to join or move between games as a group.

In those embodiments wherein Regional Manager 343 is included in one or more instances of Regional Elements 325 a game player may first contact Regional Manager 343 at the regional level and then be assigned to one of the Local Elements 320 and Local Managers 160 for actual delivery of game video. As discussed elsewhere herein, this assignment is based on testing performed by Regional Manager 343 or the like.

Global Elements 330 is the top level management unit of Game Delivery System 315 and is configured for management of Regional Elements 325 and Local Elements 320. Typically, only one of Global Elements 330 is required. Global Elements 330 includes a Website Server 345 configured to provide access to Global Elements 330 via the Internet or some other communication network. Website Server 345 is configured to provide a website for control and management of Game Delivery System 315. This website typically includes tools for assigning Local Elements 320 to Regional Elements 325, for allocating resources to Local Elements 320 and Regional Elements 325, for monitoring operation and load on Local Elements 320, and/or the like.

Website Server 345 typically makes use of a Web DB (Database) 350 configured to store records of the resources available at each of Local Elements 320 and Regional Elements 325, logs of usage of these resources, amount (bytes and time) of video streamed by Local Elements 320, the identity (e.g., which game and game publisher) of streamed video, sources of requests for video streams, logs of reliability and quality of delivered video, and/or the like. In some embodiments Global Elements 330 are configured to change game publishers a fee based on an amount of video streamed based on the publisher's games. Web DB 350 optionally further includes information on game players such as their names, locations, IP addresses, credentials, account status, billing records, activity logs, and/or the like.

Global Elements 330 typically also includes a Cloud DB (Database) 355 configured to store records of the relationships between Regional Elements 325 and Local Elements 320. Cloud DB 355 may also store locations of various resources, and/or other information relating to the computing cloud formed by Local Elements 320 and Regional Elements 325. This cloud is managed using a Cloud Control 360. Cloud Control 360 is typically a computer program configured to manage computing clouds comprising distributed and interconnected computing devices. Web DB 350 and Cloud DB 355 are optionally combined into a single database.

Global Elements 330 typically further includes a File Server 365 configured to store, for example, master copies of computer games and other software elements of Game Delivery System 315. File Server 365 is optionally configured to store all or parts of Web DB 350 and Cloud DB 355.

The elements of Game Delivery System 315 discussed herein comprise hardware, firmware and/or software stored on a computer readable medium.

Figure 4:
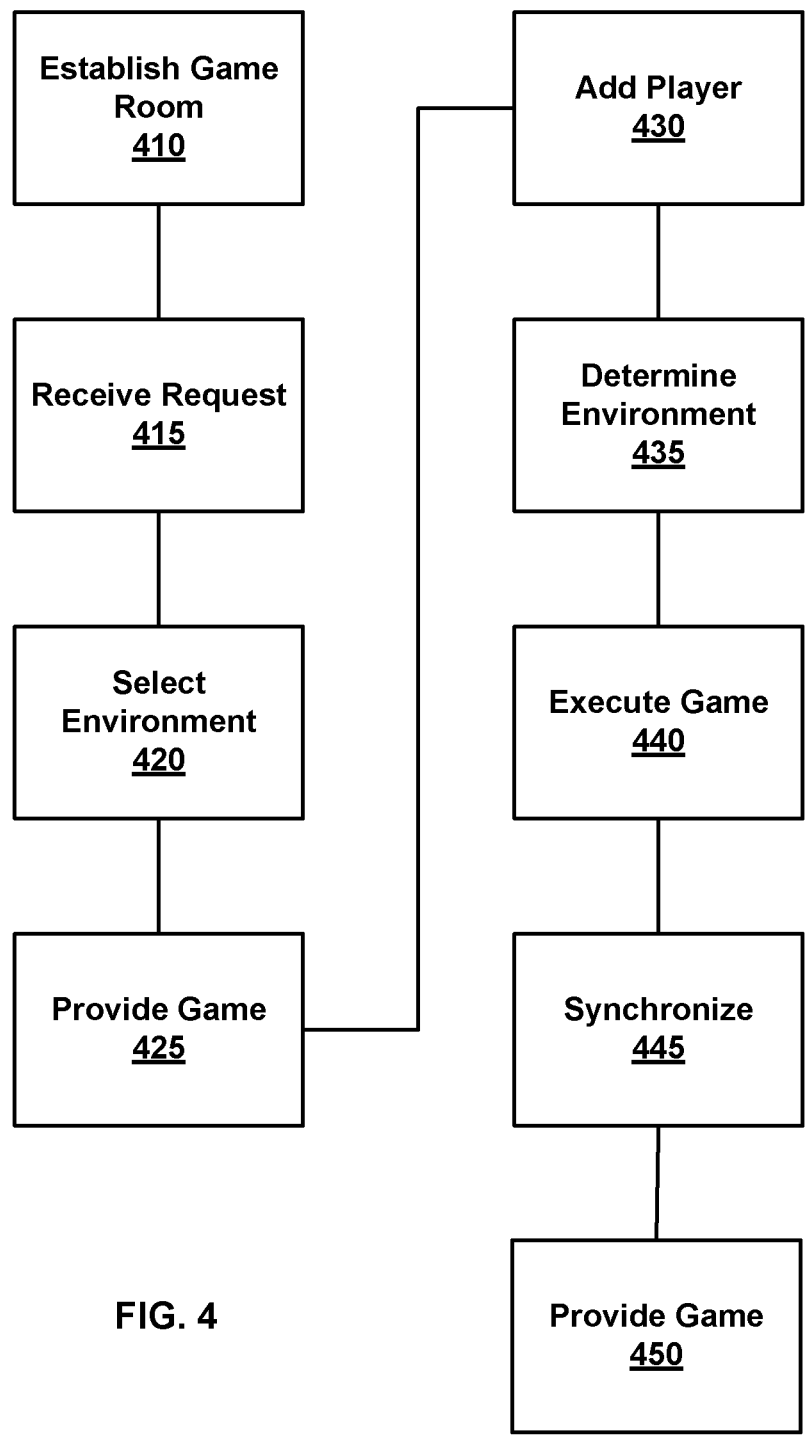
FIG. 4 illustrates a method of transferring execution of a computer game between execution environments.

FIG. 4 illustrates a method of transferring execution of a computer game between Application Execution Environments 100. This transfer may occur, for example, when it is found that a first Application Execution Environment 100 does not provide the video game as streaming video at at least a desired quality and minimum lag time, if the is delivered to several game players in a game room and the identities of these game players changes, or for reasons discussed elsewhere herein. For example, if the geographic distribution of the players receiving the same streaming video changes, then a different Application Execution Environment 100 may be better able to provide this video.

In an Establish Game Room Step 410 a virtual game room is established for use by game players to play jointly in a video game. A game room may be a simulation of a multi-player game console where two or more players can play a game together and receive the same or essentially the same video streams. Game rooms are optionally managed by Lobby Server 340. Game players can enter or leave a game room, optionally under the control of a player having ownership of the game room. For example, the game room can be established by a player wishing to invite other players. In some embodiments the player that establishes the game room is given ownership of the game room and can control which other players are in the game room.

In a Receive Request Step 415 a request for a video game is received by Regional Manager 343 or Local Manager 160 from the game room (e.g., player(s) in the game room). This request is for the video game to be delivered as streaming video from one of Application Execution Environments 100. The request is optionally made via a browser executing on one of Clients 305.

In a Select Environment Step 420 one of Application Execution Environments 100 is selected to provide the streaming video to the player(s) is the game room. This selection is typically based on which Application Execution Environment 100 is best suited to provide the streaming video, in terms of minimal lag time and other criteria discussed herein. The suitability can be based on 1) maintaining at least a minimum quality of service and/or lag time to all game players in the game room, and/or 2) an average quality of service and/or lag to all game players in the game room. The testing to determine suitability of each Application Execution Environment 100 is optionally performed using Regional Manager 343 and may include those tests taught in U.S. provisional patent application Ser. No. 61/345,534 filed May 17, 2010.

In a Provide Game Step 425 the requested game is provided as streaming video from the Application Execution Environment 100 selected in Select Environment Step 420. This streaming video may be sent to one, some or all of the players in the game room. The streaming video may also be stored or sent to third party websites. In some embodiments the same video content, but in different video formats, is sent do different players or locations. For example, one game player may receive a higher resolution video than another video, both videos being based on the same viewpoint. The video received by different players in a game room may be rendered from the same game environment but preprocessed, encoded and/or packaged differently. In some embodiments the received video includes overlays customized for each player.

In an Add Player Step 430 a player is added (or alternatively removed) from the game room. A change in the players within a game room is likely to result in a change in the geographic distribution of players. For example, if the game room previously included a player from Los Angeles and a player from San Francisco, an Application Execution Environment 100 in San Jose could have been the best available for providing video to both of these players. However, if a player from Las Vegas is added to the game room, the Application Execution Environment 100 in San Jose may no longer be the best. The second player may join the game room, for example, upon an invitation from a player already in the game room.

In a Determine Environment Step 435 a determination is made as to whether the Application Execution Environment 100 selected in Select Environment Step 420 is still the best available Application Execution Environment 100 to provide the streaming video to the new set of game players in the game room. Or, if a second Application Execution Environment 100 is more qualified to provide the streaming video, relative to the first Application Execution Environment 100. This determination may include the same tests discussed elsewhere herein, e.g., those tests discussed in relation to Select Environment Step 420 or taught in U.S. Provisional patent application Ser. No. 61/345,534.

In an Execute Game Step 440 copies of the computer game are executed on both the first and second Application Execution Environment 100. These executions optionally occur in parallel and during execution a game state may be transferred and updated from the first Application Execution Environment 100 to the second Application Execution Environment 100. During the parallel execution game commands received at the first Application Execution Environment 100 are optionally forwarded to the second Application Execution Environment 100.

In an optional Synchronize Step 445 execution of the video game on the first and second Application Execution Environments 100 are synchronized such that the video stream produced by each is approximately the same. Synchronization of the video stream allows for the source of the streaming video to be changed from the first execution environment to the second execution environment without significantly interrupting the video game from the point of view of the game players.

In a Provide Game Step 450 the source of the streaming video is changed from the first Application Execution Environment 100 to the second Application Execution Environment 100. If the game was executed in parallel on each Application Execution Environment 100 and Synchronize Step 445 was performed then the transition between sources can be performed with no or insignificant interruption of the video stream. For example, the numbering of video frames from each source is optionally synchronized such that the game playing device of the game player is not affected by the change.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

Several embodiments are specifically illustrated and/or described herein. However, it will be appreciated that modifications and variations are covered by the above teachings and within the scope of the appended claims without departing from the spirit and intended scope thereof. For example, while the examples presented herein relate to video games, the systems and methods discussed herein may be applied to other interactive video systems.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

As used herein, the term "game player" is used to refer to a person that plays a game and the term "game playing device" is used to refer to a device used to play a game.

The invention claimed is:

1. An execution environment for a cloud gaming system, comprising:
   a system manager configured to establish a virtual I/O shell for an executable game, the virtual I/O shell providing inputs to and from the executable game from a remote client, the executable game being selectable from a lobby interface that include a plurality of games that can be executed by the cloud gaming system for streaming to one or more users having an account with the cloud gaming system;
   the virtual I/O shell further including a virtual sound channel driver configured to redirect sound received from the executable game to the system manager;
   the virtual I/O shell further including a virtual video channel driver configured to redirect video data received from the executable game;
   the cloud gaming system including memory configured to store the system manager, the virtual sound channel driver, and the virtual video channel driver; and
   the cloud gaming system including a microprocessor configured to execute the system manager, the virtual sound channel driver, and the virtual video channel driver, wherein the microprocessor is part of a server of the cloud gaming system;
   wherein the virtual I/O shell provides for virtualization of the executable game for serving instances of the executable game to the remote client or other remote clients.

2. The execution environment of claim 1, wherein the virtual I/O shell is configured to simulate one or more local hardware or software input devices, and has a function or API configured to receive the input from the system manager.

3. The execution environment of claim 2, wherein the lobby interface is processed by a server of the cloud gaming system and is configured to enable players, via respective remote clients, to login and play games.

4. The execution environment of claim 1, further comprising,
   an instant messaging chat interfaces for enabling players playing said games or viewing other players play said games to communicate.

5. The execution environment of claim 1, wherein the lobby interface is configured to manage game sessions configured for one player or a group of players.

6. The execution environment of claim 1, wherein the lobby interface is configured to manage players using remote clients to enter or leave game sessions.

7. A method for executing a video game on a cloud gaming system,
   comprising,
   receiving a request from a remote client at a website to play a video game, the website configured for hosting the video game that is one of a plurality of video games made available via the cloud gaming system for streaming game play; and
   provisioning a virtual input/output (I/O) shell for the video game that was requested, the virtual I/O shell is configured to generate a virtual environment for the video game to be executed on at the cloud game system, the cloud gaming system is configured to manage an operating system and hardware that are virtualized via the virtual I/O shell, such that the video game receives control for the video game from the remote client via a system manager that interfaces with the virtual I/O shell and the system manager is configured to stream video and audio to a remote client for presentation of the video game.

8. The method of claim 7, further comprising,
providing by the cloud gaming system an execution environment that processes the provisioning of the virtual I/O shell for the video game, the executing environment is configured to provision one or more virtual I/O shells for other video games when requested by other remote clients wishing to play said other video games in streaming game play.

9. The method of claim 7, wherein the plurality of video games made available via the cloud gaming system are presented via a lobby interface.

10. The method of claim 9, wherein the cloud gaming system provides instant messaging integration for use while streaming.

11. A method for executing a video game on a cloud gaming system, comprising,
receiving a request from a remote client at a website to play a video game, the website configured for hosting the video game that is one of a plurality of video games made available via the cloud gaming system for streaming game play; and
provisioning a virtual environment for the video game that was requested, the virtual environment is configured to execute the video game on one or more servers of the cloud game system, the cloud gaming system is configured to manage an operating system and hardware that is virtualized, such that the video game receives control for the video game from the remote client via a system manager that interfaces with the virtual environment and the system manager is configured to stream video and audio to a remote client for presentation of the video game;
processing said video game using a graphics processing unit (GPU) that is shared by a plurality of provisioned virtual environments;
the provisioning by the cloud gaming system is configured to provision virtual environments for other video games when requested by other remote clients requesting to play said other video games in streaming game play.

12. The method of claim 11, wherein the plurality of video games made available via the cloud gaming system are presented via a lobby interface.

13. The method of claim 11, wherein the cloud gaming system provides instant messaging integration for use while streaming.

14. The method of claim 11, wherein the cloud gaming system is geographically distributed via two or more data centers.

15. The method of claim 14, wherein each data center provides a quality of service for said streaming depending on a connection of said remote client.

16. The method of claim 11, further comprising,
using an encoder for encoding video frames of said video game for enabling said streaming game play.

17. The method of claim 16, wherein the GPU is shared for a plurality of provisioned virtual environments that are executing video games for said streaming.

18. The method of claim 17, wherein said at least one or more of said provisioned virtual environments include a Windows emulator.

19. The method of claim 17, wherein said at least one or more of said provisioned virtual environments include a host operating system (OS), which is one of a Windows OS, or a Linux OS, or a UNIX OS, or an Apple OS, or a game console OS.

20. The method of claim 11, further comprising,
wherein the cloud gaming system is geographically distributed via two or more data centers and each data center provides a quality of service for said streaming depending on a connection of said remote client, and the cloud gaming system is configured to encode video frames of said video game for enabling said streaming game play, and the GPU is shared for a plurality of provisioned virtual environments that are executing video games for said streaming game play.

* * * * *